(12) United States Patent
Narasimha et al.

(10) Patent No.: US 9,918,227 B2
(45) Date of Patent: *Mar. 13, 2018

(54) NETWORK CONNECTIVITY SWITCHING UTILIZING AN AUTHENTICATION DEVICE

(71) Applicant: Motorola Mobility LLC, Chicago, IL (US)

(72) Inventors: Murali Narasimha, Vernon Hills, IL (US); Krishna K Bellamkonda, Lake Zurich, IL (US); Steve S Kim, Park Ridge, IL (US); Himanshu R Lokre, Chicago, IL (US); Yuanliang Lu, Glenview, IL (US); Jie Song, Naperville, IL (US); Hui Wang, Buffalo Grove, IL (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/948,953

(22) Filed: Nov. 23, 2015

(65) Prior Publication Data
US 2017/0150351 A1    May 25, 2017

(51) Int. Cl.
*H04W 12/06* (2009.01)
*H04W 36/00* (2009.01)
(Continued)

(52) U.S. Cl.
CPC ....... *H04W 12/06* (2013.01); *H04W 36/0038* (2013.01); *H04W 36/0072* (2013.01);
(Continued)

(58) Field of Classification Search
CPC .. H04L 63/0853; H04W 12/06; H04W 88/02; H04W 8/183; H04B 1/3816; H04M 2250/14
See application file for complete search history.

(56) References Cited

U.S. PATENT DOCUMENTS 6,092,133 A    7/2000 Erola et al.
6,466,804 B1 * 10/2002 Pecen ................. H04L 63/0853
                                                    455/411
(Continued)

FOREIGN PATENT DOCUMENTS

GB    2424151    9/2006

OTHER PUBLICATIONS

Murali Narasimha, et al., "Network Connectivity Switching Utilizing an Authentication Device", U.S. Appl. No. 14/948,964, filed Nov. 23, 2015.

(Continued)

*Primary Examiner* — Dung Hong

(57) ABSTRACT

In embodiments of network connectivity switching utilizing an authentication device for switching network connectivity from a first device to a second device, the authentication device receives a device switch indication from the second device, which can communicate via a cellular network. The authentication device communicates a device switch order to the first device, which is authenticated and communicatively linked for wireless communication via the cellular network. The authentication device communicates a network attach indication to the second device that then communicates an attach request to the cellular network, and the authentication device authenticates the second device to the cellular network. Alternatively, the authentication device receives a device switch indication from the second device and communicates a device switch order to the first device. The first device then communicates connection reestablishment information to the second device that initiates a connection reestablishment with the cellular network based on the connection reestablishment information.

20 Claims, 12 Drawing Sheets

(51) Int. Cl.
*H04W 60/04* (2009.01)
*H04W 60/06* (2009.01)
*H04W 8/18* (2009.01)

(52) U.S. Cl.
CPC ........... *H04W 60/04* (2013.01); *H04W 60/06* (2013.01); *H04W 8/183* (2013.01)

(56) References Cited

U.S. PATENT DOCUMENTS

| | | | | |
|---|---|---|---|---|
| 6,868,282 | B2* | 3/2005 | Carlsson | H04W 60/00 455/41.2 |
| 9,674,704 | B1 | 6/2017 | Narasimha et al. | |
| 2004/0042442 | A1* | 3/2004 | Pecen | H04W 12/04 370/352 |
| 2007/0004387 | A1* | 1/2007 | Gadamsetty | H04N 21/4126 455/414.1 |
| 2007/0004457 | A1* | 1/2007 | Han | H04W 8/20 455/558 |
| 2009/0034736 | A1* | 2/2009 | French | H04L 63/062 380/278 |
| 2009/0298467 | A1* | 12/2009 | Zohar | H04L 63/0884 455/411 |
| 2010/0278037 | A1* | 11/2010 | Jen | H04W 76/028 370/216 |
| 2010/0304670 | A1* | 12/2010 | Shuo | H04M 1/7253 455/41.1 |
| 2011/0028126 | A1* | 2/2011 | Lim | H04L 63/0853 455/411 |
| 2011/0227707 | A1* | 9/2011 | Zhu | G06K 7/0008 340/10.4 |
| 2012/0108204 | A1* | 5/2012 | Schell | H04W 8/205 455/411 |
| 2012/0171995 | A1 | 7/2012 | Krafzik et al. | |
| 2013/0036231 | A1 | 2/2013 | Suumaki | |
| 2014/0057558 | A1* | 2/2014 | Cooper | H04W 12/06 455/41.1 |
| 2014/0171027 | A1 | 6/2014 | Arkko et al. | |
| 2014/0199972 | A1* | 7/2014 | Ejima | H04W 4/008 455/411 |
| 2015/0156817 | A1* | 6/2015 | Paz | H04W 8/22 455/558 |
| 2015/0311934 | A1* | 10/2015 | Jang | H04W 12/06 455/558 |
| 2015/0326263 | A1* | 11/2015 | Li | H04W 8/205 455/558 |
| 2015/0349852 | A1* | 12/2015 | Choi | H04M 1/72519 455/41.1 |
| 2016/0285843 | A1* | 9/2016 | Popovich | H04L 63/0815 |
| 2017/0048645 | A1* | 2/2017 | Yerrabommanahalli | H04L 61/106 |
| 2017/0150352 | A1 | 5/2017 | Narasimha et al. | |

OTHER PUBLICATIONS

Stratos Card, "All-in-one Connected Card", https://stratoscard.com/, Nov. 23, 2015, 16 pages.
"Search Report", GB Application No. 1619699.0, dated Apr. 27, 2017, 4 pages.
"Search Report", GB Application No. 1619697.4, dated May 4, 2017, 4 pages.
"Notice of Allowance", U.S. Appl. No. 14/948,964, dated Mar. 17, 2017, 13 pages.

* cited by examiner

NETWORK CONNECTIVITY SWITCHING UTILIZING AN AUTHENTICATION DEVICE

BACKGROUND

Typically, users have multiple devices, such as one or more mobile phones, a tablet device, and other types of computing and electronic devices with various forms of network, data, and cellular connectivity features. Often a user has two or more devices with cellular capability (e.g., a smartphone, a tablet device, and a smartwatch device), and the user would prefer using a single phone number, as well as a single set of authentication credentials and billing information, regardless of which one of the devices is being actively used at any particular time.

Generally, a user device, such as a mobile phone with a universal subscriber identity module (USIM) can be used to connect to a cellular network, and then be utilized for hotspot capability to provide a data connection to the cellular network for another device, such as a laptop computer or a tablet device. This configuration results in both devices being active and consuming power, such as device battery power. This configuration is also inefficient, requiring two wireless transmission hops to reach the second device, even if the second device is capable of connecting to the cellular network.

Network connectivity via Wi-Fi is commonly used for other devices besides just smartphones, such as for computers, televisions, smart home devices, home appliances, etc. Wi-Fi operates in unlicensed frequency bands and is a viable option for indoor and short-range communication. Another emerging use includes technologies operating in an unlicensed spectrum. For example, LTE License Assisted Access (LTE LAA) is one such technology that allows a cellular network operator to use an unlicensed spectrum to transmit data to devices. The LTE LAA access points (APs) coexist with legacy Wi-Fi APs. Thus, devices will soon be able to use LTE-LAA to exploit the unlicensed spectrum to connect to cellular networks. It is also expected that LTE-LAA will use the spectrum more efficiently, resulting in higher data rates and support for a larger number of devices in the same spectrum.

Network operator controlled Wi-Fi APs can be utilized to offload network communication traffic via the Wi-Fi APs as an extension of a cellular/LTE network. For example, Wi-Fi will be used as an additional data path to the device, much like carrier aggregation via an LTE small cell.

Cellular network connectivity of a user device requires a SIM and authentication with the cellular network based on the SIM credentials. Managing user device connectivity to the cellular network via multiple user devices is a challenge for the user. While an operator can provision multiple devices with independent SIM cards, such an approach leads to a poor user experience for several reasons, such as each device that the user acquires is subject to network operator control, where the network operator has to explicitly provision the device by providing a SIM for it and manage authentication. Further, a user is less likely to purchase a device that needs another agreement with or additional payment to the network operator, and the SIM in each device imposes some physical design challenges, particularly in smaller devices.

BRIEF DESCRIPTION OF THE DRAWINGS

Embodiments of network connectivity switching utilizing an authentication device are described with reference to the following Figures. The same numbers may be used throughout to reference like features and components that are shown in the Figures.

DETAILED DESCRIPTION

Embodiments of network connectivity switching utilizing an authentication device are described, and provide techniques to seamlessly share a single SIM card among multiple user devices, such as a mobile phone, tablet device, smartwatch device, and/or other communication devices that are configured for network connectivity to a cellular network. Furthermore, a user can change the focus and interaction from one user device to another based on user preferences, or the devices may switch based on other factors, such as identifying the user device with the best signal conditions at a particular time. An indication of a device switch may be user-initiated or device-initiated, and when a user switches devices, the new device can establish a connection to the network quickly and seamlessly. Generally, the described techniques for network connectivity switching utilizing an authentication device are described with respect to using a universal subscriber identity module (USIM), which is an example of a "smart card" that implements a microcontroller and some associated memory.

While features and concepts of network connectivity switching utilizing an authentication device can be implemented in any number of different devices, systems, environments, and/or configurations, embodiments of network connectivity switching utilizing an authentication device are described in the context of the following example devices, systems, and methods.

Figure 1:
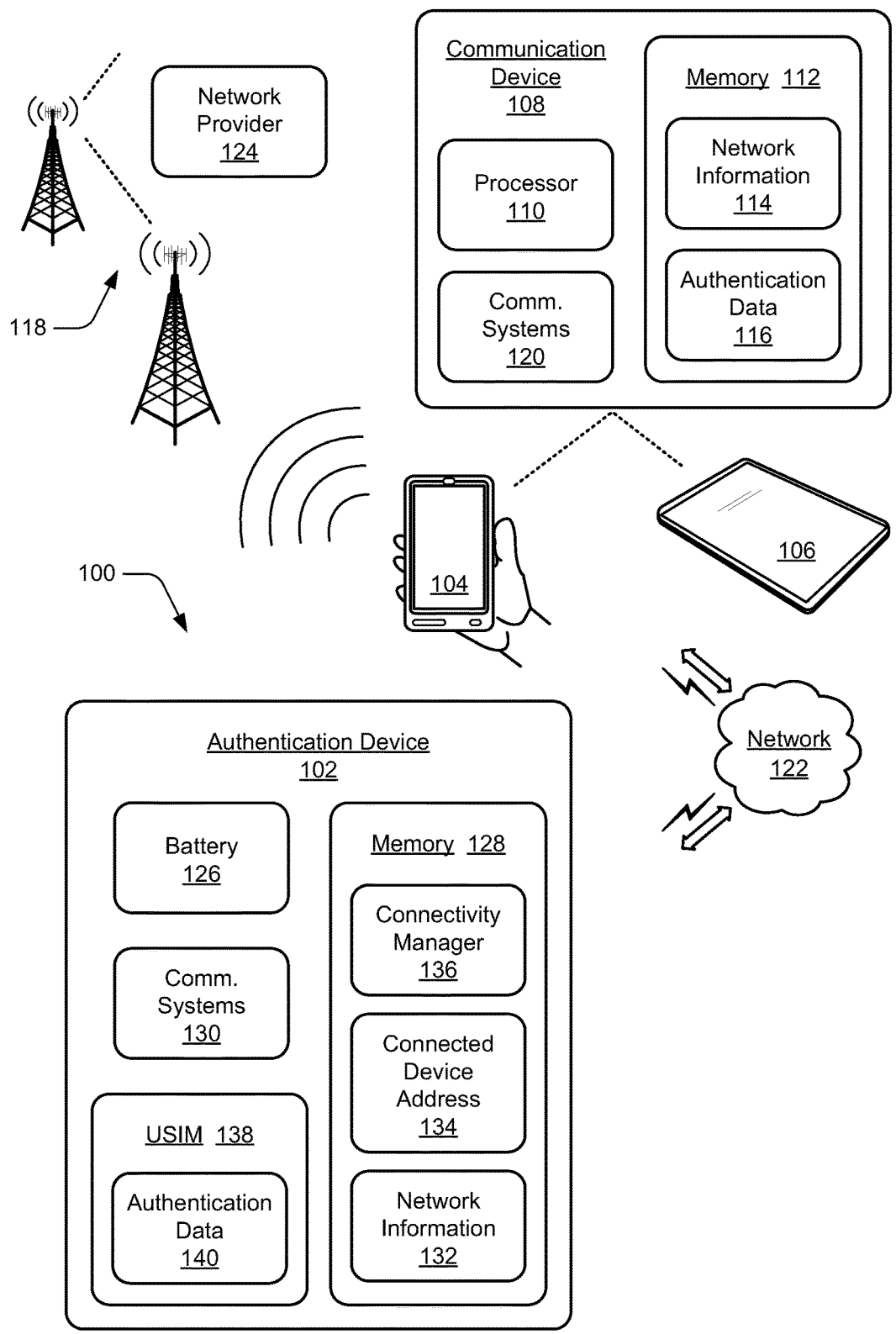
FIG. 1 illustrates an example system in which embodiments of network connectivity switching utilizing an authentication device can be implemented with an active authentication device.

FIG. 1 illustrates an example system 100 in which embodiments of network connectivity switching utilizing an authentication device can be implemented. The example system 100 includes an authentication device 102 and user devices, such as a mobile phone 104 and a tablet device 106 that are each an example of a communication device 108. A user may own and use two or more user devices that are implemented for cellular communication, such as the mobile phone 104, the tablet device 106, and/or a smartwatch device, and the user wants the devices setup to use a single phone number regardless of which one of the devices is actively being used. Although the techniques for network connectivity switching utilizing the authentication device 102 are illustrated and described herein with reference to only the two user devices (e.g., the mobile phone 104 and the tablet device 106), the techniques apply equally to more than two user devices owned by one user and setup to use a single phone number. Additionally, the two user devices can generally be referred to as a first device and a second device, but are merely referred to as the mobile phone 104 and the tablet device 106 to facilitate ease of description. Accordingly, either of the mobile phone 104 or the tablet device 106 may generally be referred to as the first device and the second device, and vice-versa.

The communication device 108 is a generalized example of the mobile phone 104 and/or the tablet device 106, and may be implemented as any type of user device that has cellular communication capability, such as a mobile phone, tablet device, smartwatch, computing, communication, entertainment, gaming, media device, and/or other types of computing and electronic devices. In this example, the communication device 108 is a mobile device implemented with various components, such as a processor 110 (or a processing system) and memory 112, as well as with any number and combination of various components as further described with reference to the example device shown in FIG. 12. Although not shown, the communication device 108 can include a power source, such as a battery, to power the various device components. The memory 112 of the communication device 108 can be utilized to maintain network information 114 and/or authentication data 116 related to authentication of the communication device 108 for network connectivity and wireless communication via a cellular network 118. In implementations, the authentication data 116 includes derived keys 117, such as $K_{NASint}$ and $K_{RRCint}$, as described in more detail below with reference to device authentication.

The communication device 108 can include different wireless radio systems, such as for Wi-Fi, Bluetooth™, Mobile Broadband, LTE, or any other wireless communication system or format. Generally, the communication device 108 implements communication systems 120 that each include a radio device, antenna, and chipset that is implemented for cellular, wireless, and other network communication with other devices, networks, and services. A communication system 120 can be configured to implement any suitable communication protocol or standard, such as a 3rd Generation Partnership Project (3GPP) protocol, Global System for Mobiles (GSM), Enhanced Data Rates for GSM (EDGE), Code Division Multiple Access (CDMA), CDMA 2000 (1×), Wideband CDMA, Time Division Synchronous CDMA (TD-SCDMA), Evolution-Data Optimized (EVDO), Universal Mobile Telecommunications System (UMTS), Long Term Evolution (LTE), LTE frequency division duplex (LTE-FDD), LTE time division duplex (LTE-TDD), LTE Advanced (LTE-A), Institute of Electrical and Electronics Engineers (IEEE) 802.11 standard, IEEE 802.16 standard and the like.

The example system 100 includes a network 122 that generally represents any of the communication and data networks described herein, and any of the communication and user devices described herein can communicate via the network 122 (or combination of networks), such as for data communication between the communication device 108 (e.g., the mobile phone 104 and/or the tablet device 106) and the authentication device 102. The network 122 can be implemented to include wired and/or wireless networks. The network can also be implemented using any type of network topology and/or communication protocol, and can be represented or otherwise implemented as a combination of two or more networks, to include cellular networks, IP-based networks, and/or the Internet. The network 122 may also include mobile operator networks that are managed by a network provider 124 (e.g., of the cellular network 118), a mobile network operator, and/or other network operators, such as a communication service provider, mobile phone provider, and/or Internet service provider.

In this example system 100, the authentication device 102 is implemented as an "active" authentication device. In alternate embodiments, an authentication device can be implemented as a "passive" authentication device as shown and described with reference to FIG. 2. Generally, the authentication devices described herein physically include one or more universal subscriber identity modules (USIMs), but do not have cellular communication capability. However, the authentication devices may include other wireless communication capability, such as Bluetooth™, Wi-Fi, RFID, and the like. Note that a user device with cellular capability, but that does not physically include a USIM, is referred to as a non-USIM device, and a traditional device that does have cellular capability and includes a USIM is referred as a USIM device. Further, as referred to herein, an authentication device that has a power source (e.g., a battery) is an active authenticator (e.g., FIG. 1) and an authentication device that does not have a power source is a passive authenticator (e.g., FIG. 2). Generally, an authentication device that does not have a battery or other power source cannot utilize Bluetooth™ or Wi-Fi communications, but rather relies on radio-frequency identification (RFID) or similar technologies.

An authentication device, such as the "active" authentication device 102 described with reference to FIG. 1 and the "passive" authentication device described with reference to FIG. 2, can include one or more USIMs. Any type of the user devices that a user interacts with (e.g., the mobile phone 104, tablet device 106, a smartwatch, smart television, home appliance device, etc.) may or may not have a SIM. In embodiments, the authentication device can provide that any of the user devices a user selects to interact with can be authenticated to a network and a connection established. Further, the authentication device can provide a quick authentication for a new device when the user switches to use the new device. Additionally, the authentication device can connect to one or more of the user devices via independent, secure communication links. For example, Wi-Fi or Bluetooth™ with appropriate encryption of the data stream can facilitate one or more of the connections between the authentication device and the user devices (e.g., the mobile phone 104 and the tablet device 106).

The authentication device 102 includes a battery 126 (e.g., a power source), and can include a processing system and memory 128, as well as any number and combination of various components as further described with reference to the example device shown in FIG. 12. The authentication device 102 also includes one or more communication systems 130 (e.g., Bluetooth™, Wi-Fi, and similar systems) that each include a radio device, antenna, and chipset implemented for wireless and data network communication with the other user devices, such as the mobile phone 104 and the tablet device 106. The authentication device 102 includes the memory 128 that is utilized to maintain network information 132 related to the user devices and network connectivity to the cellular network. The memory 128 can also be used to maintain a connected device address 134 of the user device (e.g., the mobile phone 104 or the tablet device 106) that is currently communicatively linked for wireless communication via the cellular network 118.

In this example system 100, the authentication device 102 includes a connectivity manager 136 that can be implemented as a software application or module, such as computer-executable software instructions that are executable with a processing system of the device in embodiments of network connectivity switching utilizing an authentication device. The connectivity manager 136 can be stored on computer-readable storage memory (e.g., the device memory 128), such as any suitable memory device or electronic data storage implemented in the authentication device. The authentication device 102 also includes a USIM 138 that maintains authentication data 140 for authentication of a user device (e.g., the mobile phone 104 or the tablet device 106) for network connectivity and wireless communication via the cellular network 118. In implementations, the authentication data 140 includes the unreadable key "K" 142 that is maintained in the USIM 138 for device authentication.

An embodiment of network connectivity switching utilizing the authentication device 102 is described with reference to FIG. 3 for re-authentication enabled by an active authentication device. Similarly, another embodiment of network connectivity switching utilizing the authentication device 102 is described with reference to FIG. 5 for the transfer of a radio link connection between user devices as enabled by an active authentication device. It should be noted that the techniques and methods described herein can be used with other cellular authentication smart cards, such as a universal integrated circuit card (UICC), an international SIM (ISIM), and the like. The methods can also be used with other authentication protocols such as EAP-AKA. Further, similar techniques can be used for non-cellular authentication scenarios. For example, an authentication device can include a smartcard that enables a user device to authenticate with a WLAN network or perform authentication for Digital Rights Management (DRM) purposes, such as to purchase a song or a video to be played on the device.

Figure 2:
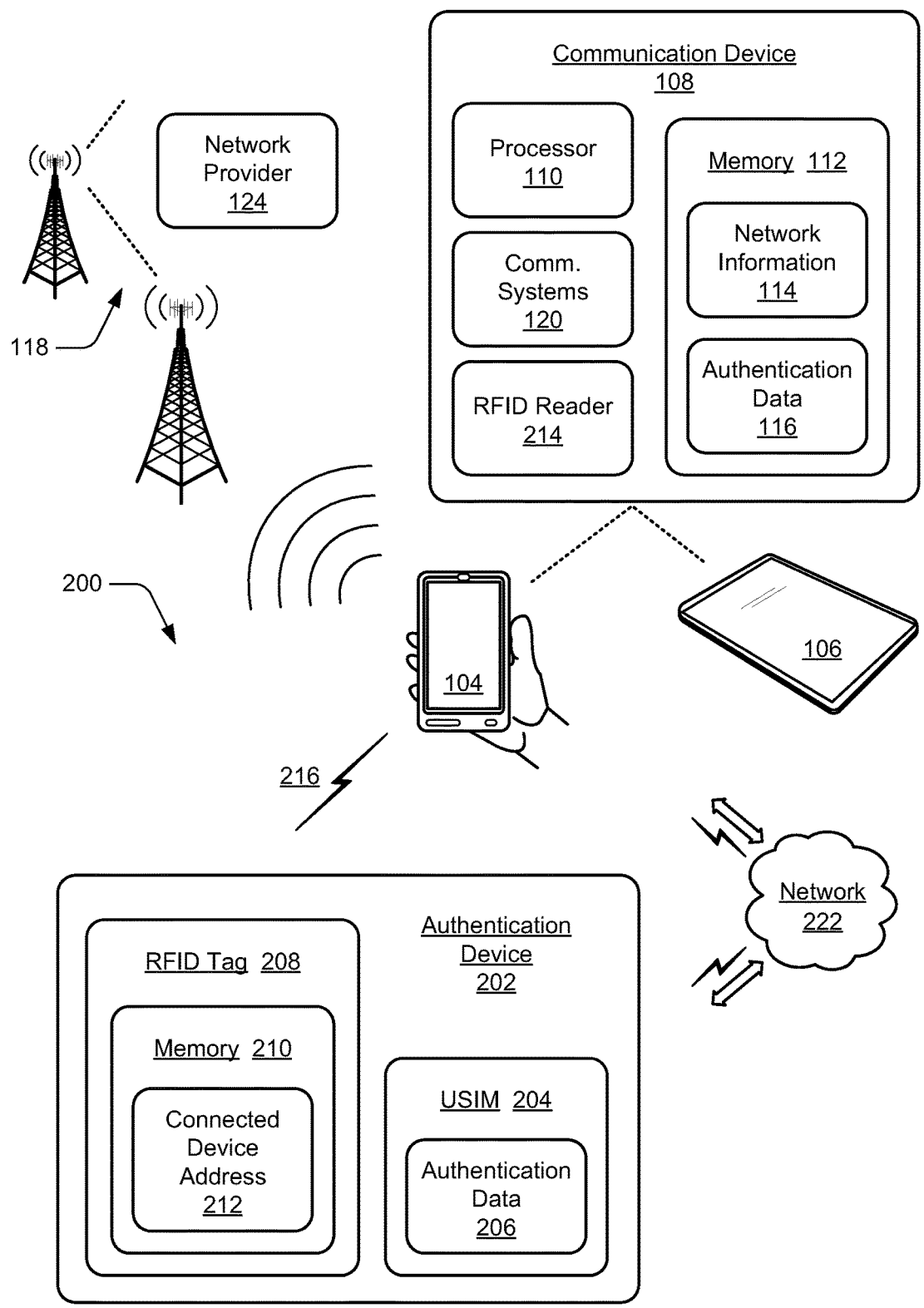
FIG. 2 illustrates an example system in which embodiments of network connectivity switching utilizing an authentication device can be implemented with a passive authentication device.

FIG. 2 illustrates another example system 200 in which embodiments of network connectivity switching utilizing an authentication device can be implemented. The example system 200 includes an authentication device 202, as well as the mobile phone 104 and the tablet device 106 that are each shown and described as the communication device 108 with reference to FIG. 1. In this example system 200, the authentication device 202 is implemented as a "passive" authentication device that generally does not include a power source (e.g., a battery).

Similar to the authentication device 102 described with reference to FIG. 1, the authentication device 202 can include one or more USIMs, such as a USIM 204 that maintains authentication data 206 for authentication of a user device (e.g., the mobile phone 104 or the tablet device 106) for network connectivity and wireless communication via the cellular network 118. In implementations, the authentication data 206 includes the unreadable key "K" 207 that is maintained in the USIM 204 for device authentication. In this example, the authentication device 202 also includes a radio-frequency identification (RFID) tag 208, which includes memory 210 that maintains a connected device address 212 of the user device (e.g., the mobile phone 104 or the tablet device 106) that is currently communicatively linked for wireless communication via the cellular network 118.

The RFID tag 208 that is implemented in the authentication device 202 may be any type of passive or active RFID tag, such as an active tag that includes a battery or other power source. Alternatively, various passive RFID tags are smaller and cheaper without a battery, and are activated when radio energy is transmitted by an RFID reader to activate a passive tag. In this example system 200, the communication device 108 includes an RFID reader 214 that is implemented with a transceiver for two-way communication with the RFID tag 208 that is activated in the presence of the RFID reader 214 to perform as a passive transponder, communicating sensor data to the communication device 108.

The RFID tag 208 of the authentication device 202 can include an ASIC module with a CPU, as well as a transceiver for two-way communication with the RFID reader 214 of the communication device 108. The RFID tag 208 also includes an antenna, and RFID tag data (e.g., the connected device address 212) can be stored in non-volatile memory 210 of the RFID tag. The ASIC module can be implemented as fixed or programmable logic for processing the RFID tag data, as well as modulating and demodulating the RF signals.

In implementations, the RFID reader 214 of the communication device 108 can wirelessly transmit an interrogation 216 to the RFID tag 208 that receives the interrogation signal, which effectively requests the RFID tag 208 to provide data or information wirelessly. A request of an interrogation signal may designate particular information to be obtained, or may request information generally from the RFID tag. In response to receipt of the interrogation 216, the ASIC module of the RFID tag 208 formulates a response that includes the connected device address 212, and the response is wirelessly transmitted to the communication device 108. The RFID reader 214 of the communication device 108 receives the response signal from the RFID tag, and the response signal can include the data from the RFID tag.

The RFID interrogation 216 from the RFID reader 214 of the communication device 108, as well as the response signals from the RFID tag 208, can be communicated using low frequency (LF), high frequency (HF), or ultra-high frequency (UHF) radio waves. An active RFID tag can include or otherwise have access to an independent power source, such as a battery or comparable device. A passive RFID tag can derive energy from the interrogation 216, which enables the RFID tag 208 to generate and communicate back a response signal.

An embodiment of network connectivity switching utilizing the authentication device 202 is described with reference to FIG. 6 for re-authentication enabled by a passive authentication device. Similarly, another embodiment of network connectivity switching utilizing the authentication device 202 is described with reference to FIG. 7 for the transfer of a radio link connection between user devices as enabled by a passive authentication device.

Figure 3:
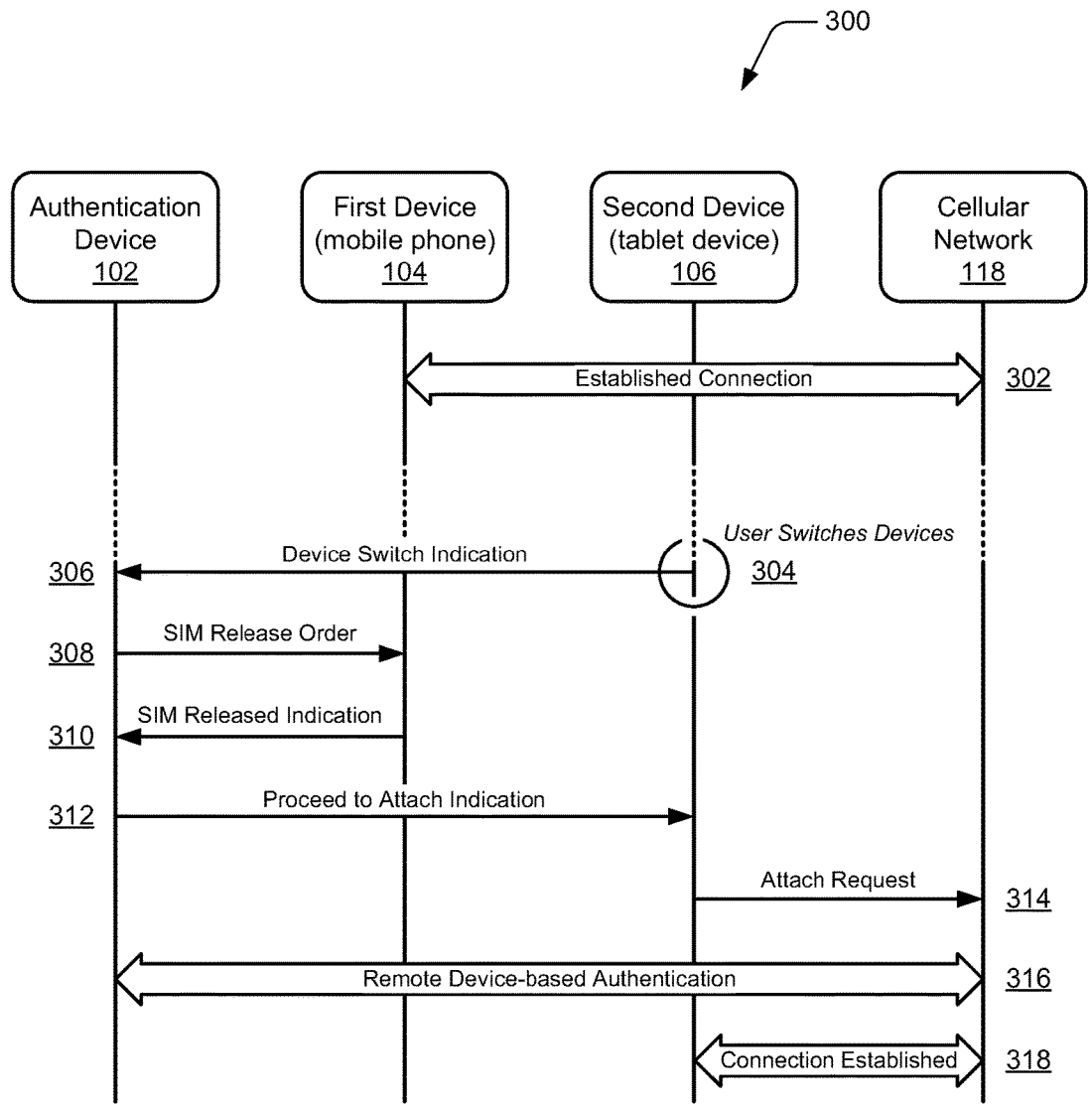
FIG. 3 illustrates an example of re-authentication enabled by an active authentication device in embodiments of network connectivity switching utilizing the authentication device.

FIG. 3 illustrates an example 300 of re-authentication enabled by an active authentication device in embodiments of network connectivity switching utilizing the authentication device 102, which is shown and described with reference to FIG. 1. This example 300 illustrates communications between a first device (e.g., the mobile phone 104), a second device (e.g., the tablet device 106), and the authentication device 102 when switching the network connectivity from the mobile phone 104 to the tablet device 106 using the same USIM credentials for wireless communication via the cellular network 118.

In this example 300, the mobile phone 104 has an established connection 302 with the cellular network 118 and is communicatively linked for wireless communication via the cellular network. The user may then switch devices at 304, from the mobile phone to use the tablet device, and the tablet device 106 communicates a device switch indication 306 to the mobile phone 104. A change of device use may be based on user preference, or based on a signal condition, such as identifying the user device with the best signal conditions at a particular time. The trigger to initiate the device switch indication 306 may be user-initiated or device-initiated, such as when the user uses an application on a different device and use of the application is a device switch indication.

The authentication device 102 receives the device switch indication 306 from the tablet device 106 and communicates a device switch order 308 to the mobile phone 104. In this instance, the device switch order 308 is a message to release the SIM or the USIM credentials that are the basis for the established connection 302 with the cellular network 118. The mobile phone 104 can comply with the device switch order 308 by, for example, releasing the connection and detaching from the network. The authentication device 102 can also receive an acknowledgement, in the form of a SIM released indication 310, from the mobile phone 104 that the communication link with the cellular network 118 has been released. The authentication device 102 can then communicate a network attach indication 312 (e.g., the proceed to attach indication) to the tablet device 106, and the tablet device then communicates an attach request 314 to the cellular network 118.

The authentication device 102 can authenticate the tablet device 106 to the cellular network 118 with remote device-based authentication 316, as shown and described with reference to FIG. 4. As part of the attach procedure, the tablet device 106 receives an authentication challenge (AKA challenge) from the cellular network 118, and the authentication device 102 receives authentication request data from the tablet device 106. The authentication device 102 communicates an authentication response back to the tablet device 106, which then forwards the authentication response to the cellular network. A connection is then established at 318 to complete switching the network connectivity to the tablet device 106 (from the mobile phone 104) for wireless communication via the cellular network.

Figure 4:
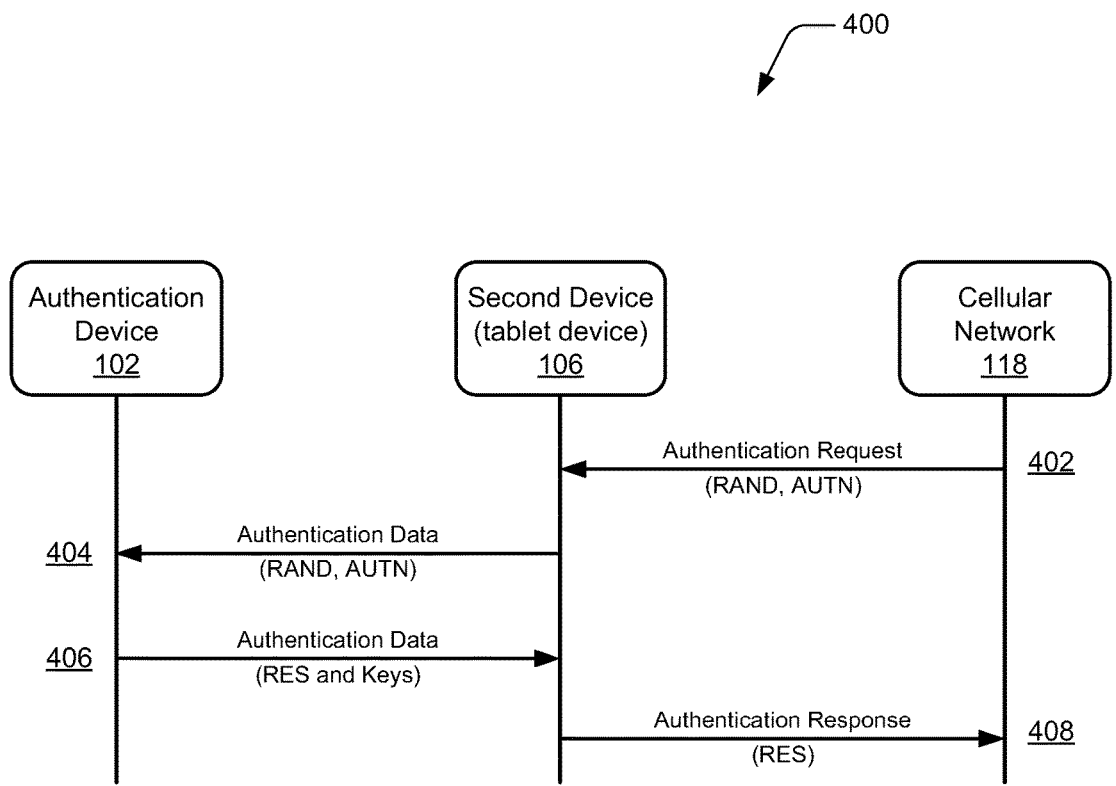
FIG. 4 illustrates an example of remote device authentication in embodiments of network connectivity switching utilizing an authentication device.

FIG. 4 illustrates an example 400 of remote device authentication in embodiments of network connectivity switching utilizing an authentication device. This example 400 illustrates communications between the tablet device 106 (e.g., the second device) and the authentication device 102 when the technique is used to authenticate the device requesting to establish network connectivity with the cellular network 118. In this instance, the tablet device 106 (e.g., the second device) is using the credentials of the authentication device 102 to communicate on the network. In implementations, the tablet device 106 receives an authentication request 402 from the cellular network 118, and the tablet device communicates the request as authentication data 404 to the authentication device 102.

Authentication parameters including RAND and AUTN are included in the authentication data 404, and the authentication device 102 receives the authentication data from the tablet device 106. The authentication device 102 performs computations involving the received authentication data 404 and the stored security keys (e.g., authentication data 140) on the USIM 138. Specifically, the authentication device 102 computes a response code (RES) to the authentication request, and then communicates authentication data 406 that includes the response code (RES) and security keys back to the tablet device 106, which then forwards (e.g., communicates, transmits, etc.) an authentication response 408 to the cellular network for authentication of the user device.

Different security keys can be used for user/network authentication and security in a Universal Mobile Telecommunications System (UMTS)/Long Term Evolution (LTE) network. In an LTE embodiment, an authentication device (e.g., as represented by the authentication device 102) can be user equipment that includes the Universal Subscriber Identity Module (USIM) 138, which has the secret key K 142. The same secret key K can be available at an operator's authentication center on the network. The secret key K may not be directly read from the USIM 138. The authentication device 102 can take input parameters from a user device (e.g., as represented by the tablet device 106 in this example), and the USIM 138 performs computations using the key K and returns the results to the user device.

Generally, the user equipment can be considered as consisting of two components: the mobile equipment circuitry and the USIM. An interface between the mobile equipment and the USIM can be standardized and supports various commands and procedures that can enable the mobile equipment to obtain parameters necessary for authentication and security from the USIM. The authentication procedure can be a procedure called Authentication and Key Agreement (AKA), which can involve a challenge/response mechanism. First, the network can send a random challenge RAND and an authentication token AUTN. Then, the USIM in the authentication device can check whether the AUTN token is acceptable. If it is acceptable, the USIM can generate a response RES, which is provided to the mobile equipment. The USIM can also compute a Cipher Key (CK) and an Integrity Key (IK) (e.g., derived keys 117) from the secret key K (e.g., key K 142). The CK and IK can be available to the mobile equipment, as opposed to only being stored only in the USIM. The mobile equipment can send a response message to the AKA challenge, which includes the RES, to the network.

The mobile equipment can then use the CK and IK to generate an Access Security Management Entity Key (KASME), which in turn can be used to generate other keys, such as for Non Access Stratum (NAS) encryption and integrity, for user plane and control plane encryption and integrity, and other keys. For example, an AKA procedure can be used to provide mutual authentication between the authentication device and the network, and agreement on the KASME. The KASME can form the basis for generation of Access Stratum (AS) and NAS ciphering and integrity keys to be used for AS Radio Resource Control (RRC), as well as user plane protection and NAS signaling protection, respectively. The KASME, CK, and IK can be stored in the mobile equipment and can be used until there is a new AKA procedure.

Following the AKA procedure, a NAS Security Mode Command (SMC) procedure can be performed. In the NAS SMC procedure, the MME sends a NAS SMC message to the UE, which includes a NAS Message Authentication Code (NAS-MAC). The NAS-MAC is generated by first generating a NAS Integrity Key (KNASint) based on the KASME, and generating the NAS-MAC based on the KNASint and NAS state parameters including a downlink NAS message count. In order to verify the integrity of the NAS-SMC message, the UE can generate its own version of the NAS-MAC, by first generating the KNASint based on the stored KASME and then generating the NAS-MAC based on the KNASint and NAS state parameters including the downlink NAS message count. If the NAS-MAC generated by the UE is identical to the NAS-MAC included in the NAS-SMC message, the NAS-SMC message is considered verified. The UE then sends a NAS SMC complete message to the MME, which includes a second NAS-MAC. The second NAS-MAC is computed by the UE based on the KNASint and NAS state parameters including the uplink NAS message count. In order to verify the integrity of the NAS-SMC complete message, the MME derives its own version of the NAS-MAC. If the second NAS-MAC derived by the MME is identical to the NAS-MAC sent by the UE, the NAS-SMC complete message is considered verified and the NAS SMC procedure is complete. The NAS SMC procedure also generates a NAS encryption key (KNASenc). The NAS encryption and integrity keys can be used for NAS layer communication to protect NAS information against fake base stations.

Along with the NAS SMC procedure a base station (eNB) specific key (KeNB) can be generated. The KeNB can be used to generate other keys for encryption and integrity protection of the link between the UE and the eNB. Also along with the NAS SMC procedure, an AS SMC procedure can be performed. In the AS SMC procedure, the eNB sends the UE an AS SMC message which includes a Message Authentication Code-Integrity (MAC-I). The MAC-I is generated by receiving the KeNB from the MME, deriving a Radio Resource Control Integrity Key (KRRCint), and then deriving the MAC-I based on the KRRCint and PDCP state parameters including a PDCP message count. In order to check the integrity of the AS SMC message, the UE can generate its own version of the MAC-I by first deriving the KRRCint based on the KeNB, and then deriving the MAC-I based on the KRRCint and PDCP state parameters including a PDCP message count. The AS SMC message is considered verified if the MAC-I derived by the UE is identical to the MAC-I included in the AS SMC message. The UE then sends a AS SMC Complete message to the eNB, which includes a second MAC-I. The second MAC-I is generated in the same manner as the MAC-I in the AS SMC message. The eNB generates its own version of the second MAC-I. If the MAC_I generated by the eNB is identical to the MAC-I included in the AS SMC Complete message, the AS SMC Complete message is considered verified and the AS SMC procedure is complete. A new KeNB* can be generated at handover to a new base station using the current KeNB or another parameter Next Hop (NH), which can be generated from KASME and KeNB.

The AKA challenge can be performed for registration of a user in a serving network, for Location update/Tracking area update, for an Attach Request, and for a Detach Request. Mobility events, such as handover and cell reselection, may not necessitate generating a new KASME. The AKA challenge and the generation of a new KASME can be infrequent, and if the mobile equipment does not change MMEs, an AKA challenge may not be triggered. However, the operator of the network may have the option to perform an AKA challenge to the mobile equipment at any time. Additionally, the SMC procedure can be performed at connection establishment and connection reestablishment.

Figure 5:
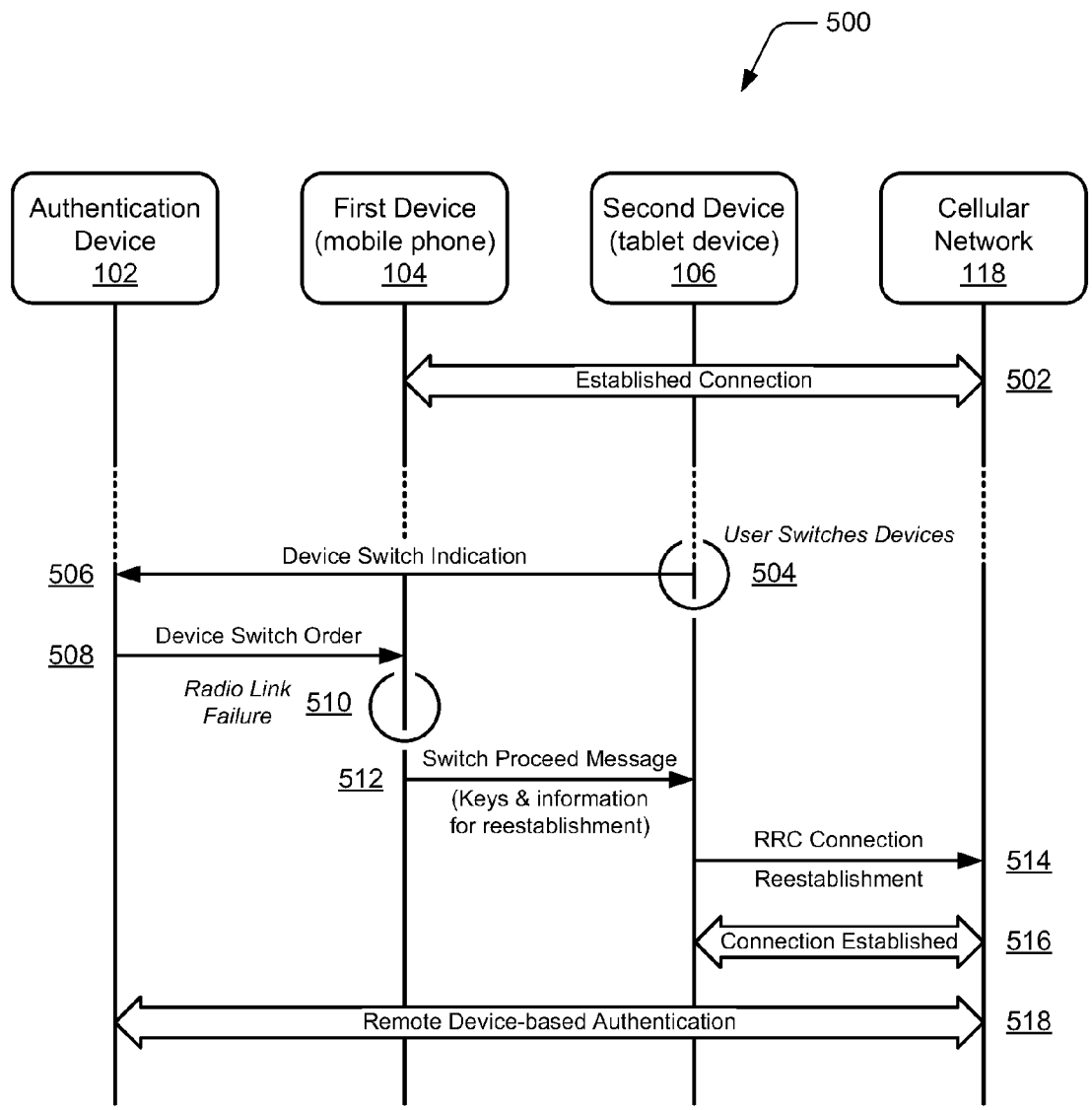
FIG. 5 illustrates an example for the transfer of a radio link connection between user devices as enabled by an active authentication device in embodiments of network connectivity switching utilizing the authentication device.

FIG. 5 illustrates an example 500 for the transfer of a radio link connection between user devices as enabled by an active authentication device in embodiments of network connectivity switching utilizing the authentication device 102, which is shown and described with reference to FIG. 1. This example 500 illustrates communications between the mobile phone 104 (e.g., a first device), the tablet device 106 (e.g., a second device), and the authentication device 102 when switching the network connectivity from the mobile phone 104 to the tablet device 106 using the same USIM credentials for wireless communication via the cellular network 118.

In this example 500, the mobile phone 104 has an established connection 502 with the cellular network 118 and is communicatively linked for wireless communication via the cellular network. The user may then switch devices at 504, from the mobile phone to use the tablet device, and the tablet device 106 communicates a device switch indication 506 to the mobile phone 104. The authentication device 102 receives the device switch indication 506 from the tablet device 106 and communicates a device switch order 508 to the mobile phone 104. In this instance, the device switch order 508 is received, the mobile phone 104 stops all transmissions, and declares a radio link failure 510.

The mobile phone 104 then communicates a switch proceed message 512 along with connection reestablishment information to the tablet device 106. The message includes the authentication keys (e.g., derived keys $K_{NASint}$ and $K_{RRCint}$) computed by the mobile phone 104 and negotiated with the cellular network 118, and includes information related to connection reestablishment. The information related to connection establishment can include NAS state parameters, such as a downlink NAS message count, and can include PDCP state parameters, such as a PDCP message count. For connection reestablishment in LTE, the information includes: C-RNTI of the first device (e.g., the mobile phone), a physical cell ID of the cell the mobile phone was using, and shortMAC-I (see 3GPP TS 36.331). The tablet device 106 sets its C-RNTI to the C-RNTI provided by the mobile phone 104, and then communicates a connection reestablishment message 514 to the cellular network 118 based on the information received from the mobile phone 104. In this instance, the connection reestablishment message 514 is a radio resource control (RRC) connection reestablishment message (see 3GPP TS 36.331).

A connection is then established at 516 to complete switching the network connectivity to the tablet device 106 (from the mobile phone 104) for wireless communication via the cellular network. In this example, the RRC connection reestablishment technique is used to recover the "lost connection" of the mobile phone 104 and reestablish the connection with the tablet device 106, which looks to be the same device to the cellular network 118. In implementations, the tablet device 106 may receive an authentication request from the cellular network 118 when the network receives the RRC connection reestablishment message 514. The tablet device 106 can then perform the remote device-based authentication 518 with the authentication device 102 that authenticates the tablet device 106 to the cellular network 118, as shown and described with reference to FIG. 4.

Figure 6:
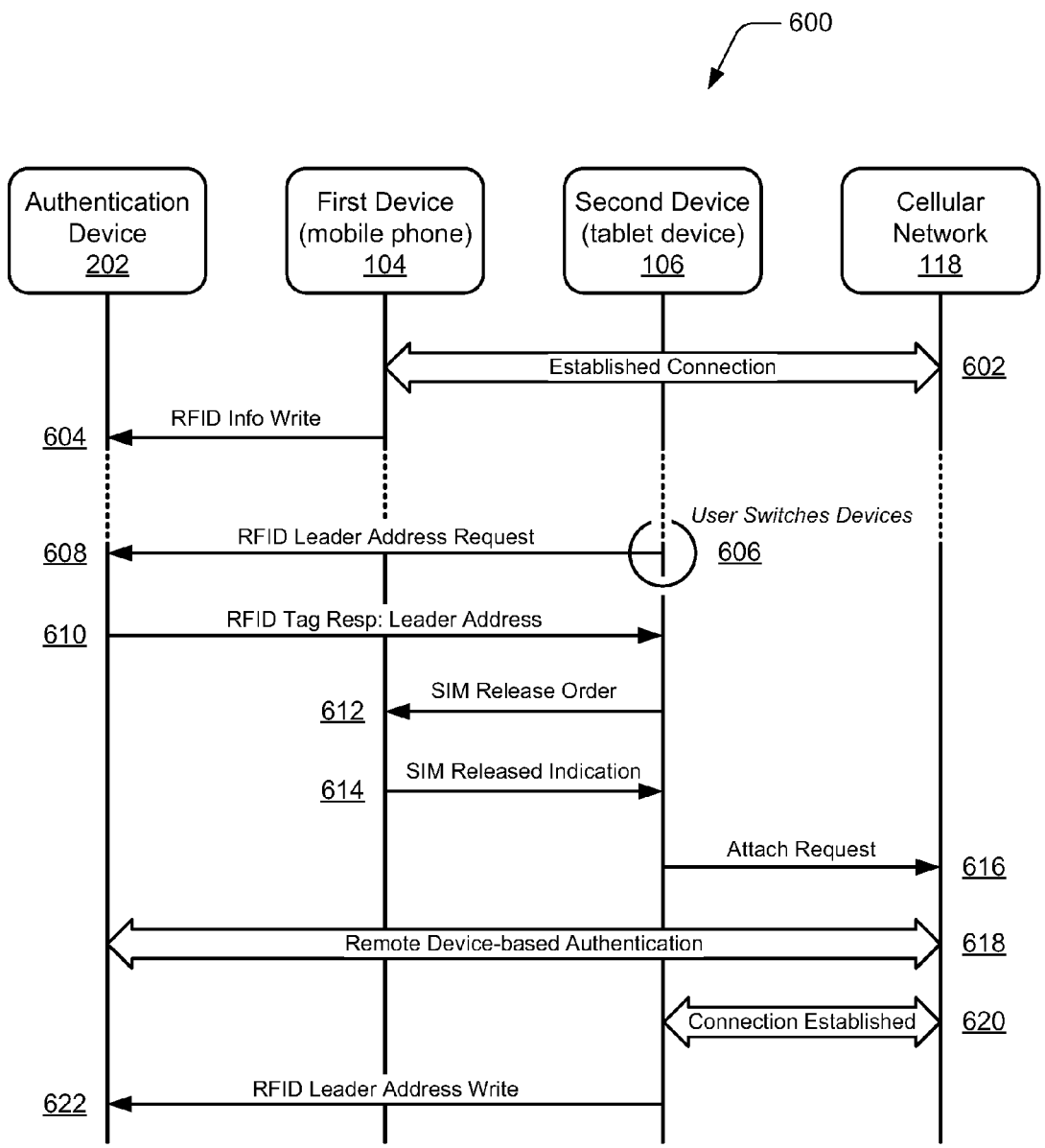
FIG. 6 illustrates an example of re-authentication enabled by a passive authentication device in embodiments of network connectivity switching utilizing the authentication device.

FIG. 6 illustrates an example 600 of re-authentication enabled by a passive authentication device in embodiments of network connectivity switching utilizing the authentication device 202, which is shown and described with reference to FIG. 2. This example 600 illustrates communications between a first device (e.g., the mobile phone 104), a second device (e.g., the tablet device 106), and the authentication device 202 when switching the network connectivity from the mobile phone 104 to the tablet device 106 using the same USIM credentials for wireless communication via the cellular network 118. The changes in the signaling between the devices and the authentication device 202 reflect the fact that the authentication device does not have a power supply and responds to RFID read/write commands.

In this example 600, the mobile phone 104 has an established connection 602 with the cellular network 118 and is communicatively linked for wireless communication via the cellular network. The mobile phone 104 initiates an RFID information write 604 to write an address of the mobile phone (e.g., a MAC or IP address) to the memory 210 on the RFID tag 208 of the authentication device 202 as an indication of the leader device that is currently communicatively linked for wireless communication via the cellular network 118. The RFID tag 208 of the authentication device 202 receives the address write from the RFID reader 214 of the mobile phone 104 and maintains the address of the mobile phone with the RFID tag memory 210.

The user may then switch devices at 606, from the mobile phone to use the tablet device, and the RFID reader 214 of the tablet device 106 interrogates the RFID tag 208 of the authentication device 202 with an RFID leader address request 608 to determine the address of the leader device (e.g., the mobile phone 104 in this example) that is currently using the SIM credentials and communicatively linked for wireless communication via the cellular network 118. The RFID tag 208 of the authentication device 202 receives the RFID leader address request 608 as the RFID interrogation 216 from the RFID reader 214 of the tablet device 106. The RFID reader 214 of the tablet device 106 receives an RFID tag response 610 of the requested leader address.

The tablet device 106 then communicates a device switch order 612 to the mobile phone 104 using the leader device address obtained from the RFID tag 208 of the authentication device 202. In this instance, the device switch order 612 is a message to release the SIM or the USIM credentials that are the basis for the established connection 602 with the cellular network 118. The mobile phone 104 can comply with the device switch order 612 by, for example, releasing the connection and detaching from the network. The tablet device 106 can also receive an acknowledgement, in the form of a SIM released indication 614, from the mobile phone 104 that the communication link with the cellular network 118 has been released. The tablet device 106 can then communicate an attach request 616 to the cellular network 118.

The authentication device 202 can authenticate the tablet device 106 to the cellular network 118 with remote device-based authentication 618, as shown and described with reference to FIG. 4. As part of the attach procedure, the tablet device 106 receives an authentication challenge (AKA challenge) from the cellular network 118, and the authentication device 202 receives authentication request data from the tablet device 106. The authentication device 202 communicates an authentication response back to the tablet device 106, which then forwards the authentication response to the cellular network. A connection is then established at 620 to complete switching the network connectivity to the tablet device 106 (from the mobile phone 104) for wireless communication via the cellular network.

The tablet device 106 can then initiate an RFID leader address write 622 to write an address of the tablet device (e.g., a MAC or IP address) to the RFID tag memory 210 on the RFID tag 208 of the authentication device 202 as an indication of the leader device that is currently communicatively linked for wireless communication via the cellular network 118. The RFID tag 208 of the authentication device 202 receives the address write 622 from the RFID reader 214 of the tablet device 106 and maintains the address of the tablet device with the RFID tag memory 210.

Figure 7:
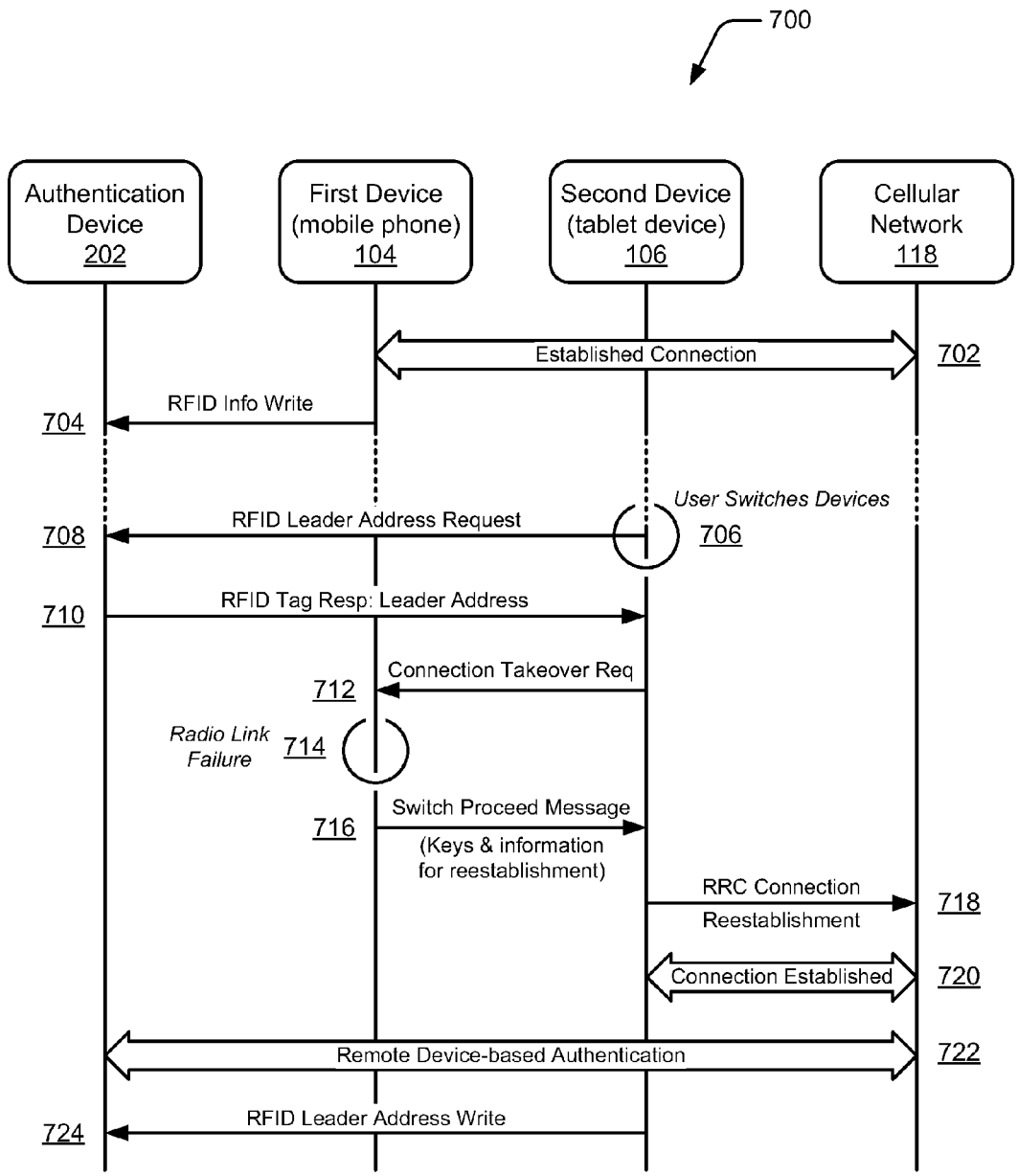
FIG. 7 illustrates an example for the transfer of a radio link connection between user devices as enabled by a passive authentication device in embodiments of network connectivity switching utilizing the authentication device.

FIG. 7 illustrates an example 700 for the transfer of a radio link connection between user devices as enabled by a passive authentication device in embodiments of network connectivity switching utilizing the authentication device 202, which is shown and described with reference to FIG. 2. This example 700 illustrates communications between the mobile phone 104 (e.g., a first device), the tablet device 106 (e.g., a second device), and the authentication device 202 when switching the network connectivity from the mobile phone 104 to the tablet device 106 using the same USIM credentials for wireless communication via the cellular network 118. The changes in the signaling between the devices and the authentication device 202 reflect the fact that the authentication device does not have a power supply and responds to RFID read/write commands.

In this example 700, the mobile phone 104 has an established connection 702 with the cellular network 118 and is communicatively linked for wireless communication via the cellular network. The mobile phone 104 initiates an RFID information write 704 to write an address of the mobile phone (e.g., a MAC or IP address) to the RFID tag memory 210 on the RFID tag 208 of the authentication device 202 as an indication of the leader device that is currently communicatively linked for wireless communication via the cellular network 118. The RFID tag 208 of the authentication device 202 receives the address write from the RFID reader 214 of the mobile phone 104 and maintains the address of the mobile phone with the RFID tag memory 210.

The user may then switch devices at 706, from the mobile phone to use the tablet device, and the RFID reader 214 of the tablet device 106 interrogates the RFID tag 208 of the authentication device 202 with an RFID leader address request 708 to determine the address of the leader device (e.g., the mobile phone 104 in this example) that is currently using the SIM credentials and communicatively linked for wireless communication via the cellular network 118. The RFID tag 208 of the authentication device 202 receives the RFID leader address request 708 as the RFID interrogation 216 from the RFID reader 214 of the tablet device 106. The RFID reader 214 of the tablet device 106 receives an RFID tag response 710 of the requested leader address. The tablet device 106 communicates a connection takeover request 712 to the mobile phone 104 using the leader device address obtained from the RFID tag 208 of the authentication device 202. In this instance, the connection takeover request 712 is received, the mobile phone 104 releases the connection, and declares a radio link failure 714.

The mobile phone 104 then communicates a switch proceed message 716 (e.g., to indicate that the network connection has been released) along with connection reestablishment information to the tablet device 106. The message includes the authentication keys (e.g., derived keys $K_{NASint}$ and $K_{RRCint}$) computed by the mobile phone 104 and negotiated with the cellular network 118, and information related to connection reestablishment. For connection reestablishment in LTE, the information includes: C-RNTI of the first device (e.g., the mobile phone), a physical cell ID of the cell the mobile phone was using, and shortMAC-I (see 3GPP TS 36.331). The tablet device 106 sets its C-RNTI to the C-RNTI provided by the mobile phone 104, and then communicates a connection reestablishment message 718 to the cellular network 118 based on the information received from the mobile phone 104. In this instance, the connection reestablishment message 718 is a radio resource control (RRC) connection reestablishment message (see 3GPP TS 36.331).

A connection is then established at 720 to complete switching the network connectivity to the tablet device 106 (from the mobile phone 104) for wireless communication via the cellular network. In this example, the RRC connection reestablishment technique is used to recover the "lost connection" of the mobile phone 104 and reestablish the connection with the tablet device 106, which looks to be the same device to the cellular network 118. The tablet device 106 can then initiate an RFID leader address write 722 to write an address of the tablet device (e.g., a MAC or IP address) to the RFID tag memory 210 on the RFID tag 208 of the authentication device 202 as an indication of the leader device that is currently communicatively linked for wireless communication via the cellular network 118. The RFID tag 208 of the authentication device 202 receives the address write 722 from the RFID reader 214 of the tablet device 106 and maintains the address of the tablet device with the RFID tag memory 210.

In implementations, the tablet device 106 may receive an authentication request from the cellular network 118, such as when the network receives the RRC connection reestablishment message 718 or at a later time when the network has a need to re-authenticate. The tablet device 106 can then perform the remote device-based authentication 724 with the authentication device 202 that authenticates the tablet device 106 to the cellular network 118, as shown and described with reference to FIG. 4.

Example methods 800, 900, 1000, and 1100 are described with reference to respective FIGS. 8, 9, 10, and 11 in accordance with implementations of network connectivity switching utilizing an authentication device. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 8:
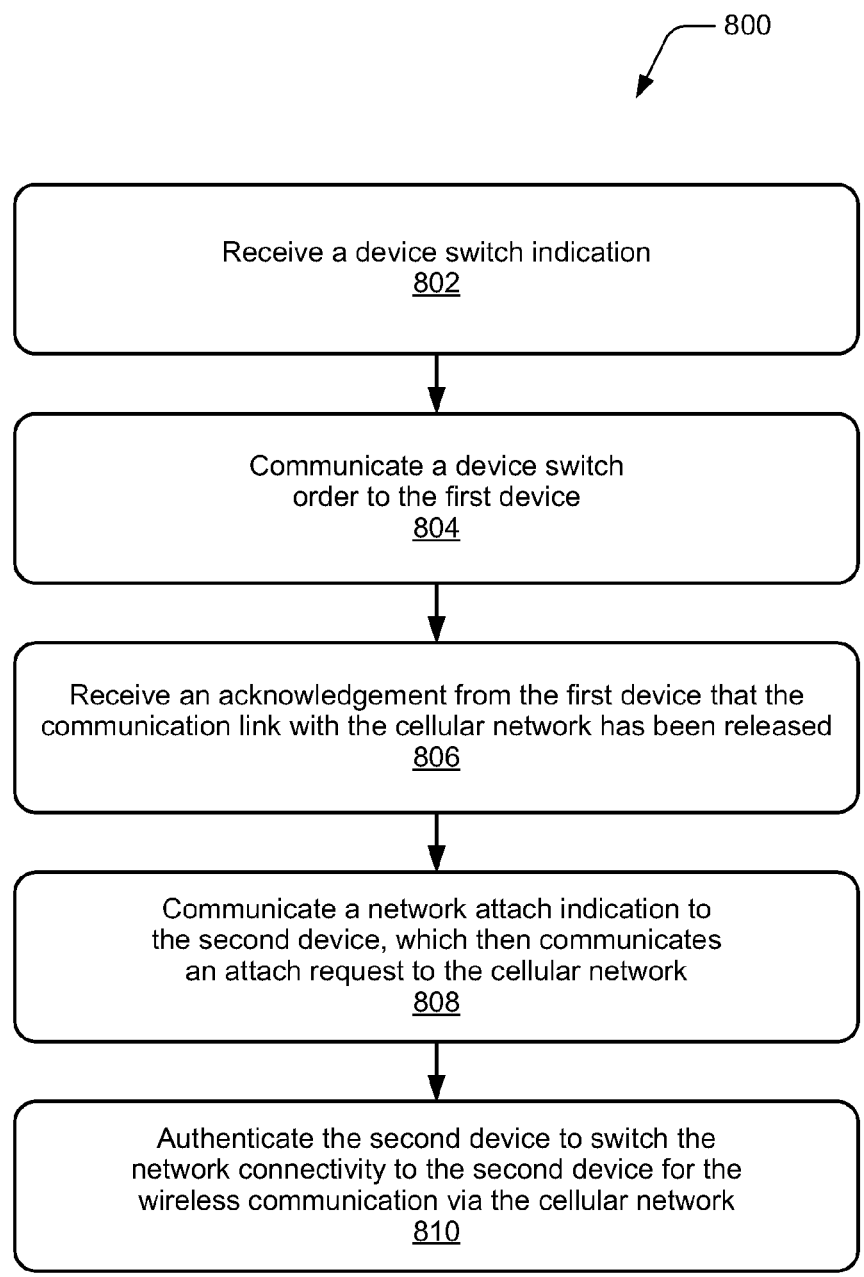
FIG. 8 illustrates example method(s) of re-authentication enabled by an active authentication device in accordance with one or more embodiments.

FIG. 8 illustrates example method(s) 800 of re-authentication enabled by an active authentication device in embodiments of network connectivity switching utilizing the authentication device 102, which is shown and described with reference to FIGS. 1 and 3. The order in which the method is described is not intended to be construed as a limitation, and any number or combination of the described method operations can be performed in any order to perform a method, or an alternate method.

At 802, a device switch indication is received. For example, the authentication device 102 is utilized to switch network connectivity from a first device (e.g., the mobile phone 104) to a second device (e.g., the tablet device 106). Initially, the mobile phone 104 is authenticated and communicatively linked for wireless communication via the cellular network 118, and the authentication device 102 receives the device switch indication 306 from the tablet device 106. At 804, a device switch order is communicated to the first device. For example, the authentication device 102 communicates the device switch order 308 to the mobile phone 104, such as a subscriber identity module (SIM) release order communicated to the mobile phone as a message to release the SIM or the USIM credentials that are the basis for the established connection 302 with the cellular network 118.

At 806, an acknowledgement is received from the first device that the communication link with the cellular network has been released. For example, the authentication device 102 receives the SIM released indication 310 (e.g., a SIM release acknowledgement) from the mobile phone 104 when the communication link with the cellular network 118 has been released. At 808, a network attach indication is communicated to the second device, which then communicates an attach request to the cellular network. For example, the authentication device 102 communicates the network attach indication 312 as a proceed to attach message to the tablet device 106, and the tablet device then communicates the attach request 314 to the cellular network 118.

At 810, the second device is authenticated to switch the network connectivity to the second device for the wireless communication via the cellular network. For example, the authentication device 102 authenticates the tablet device 106 to the cellular network 118 with remote device-based authentication 316 (e.g., as shown and described with reference to FIG. 4). Authenticating the tablet device 106 includes the authentication device 102 receiving authentication request data 404 from the tablet device 106, which initially receives the authentication request data as the authentication request 402 (e.g., an authentication challenge) from the cellular network 118. The authentication device 102 then communicates an authentication response (e.g., the authentication data 406) back to the tablet device 106, which then forwards the authentication response 408 to the cellular network. The tablet device 106 is then communicatively linked for wireless communication via the cellular network 118 based on the authentication challenge and authentication response to the cellular network. The connection is established at 318 to complete the network connectivity switch from the mobile phone 104 to the tablet device 106.

Figure 9:
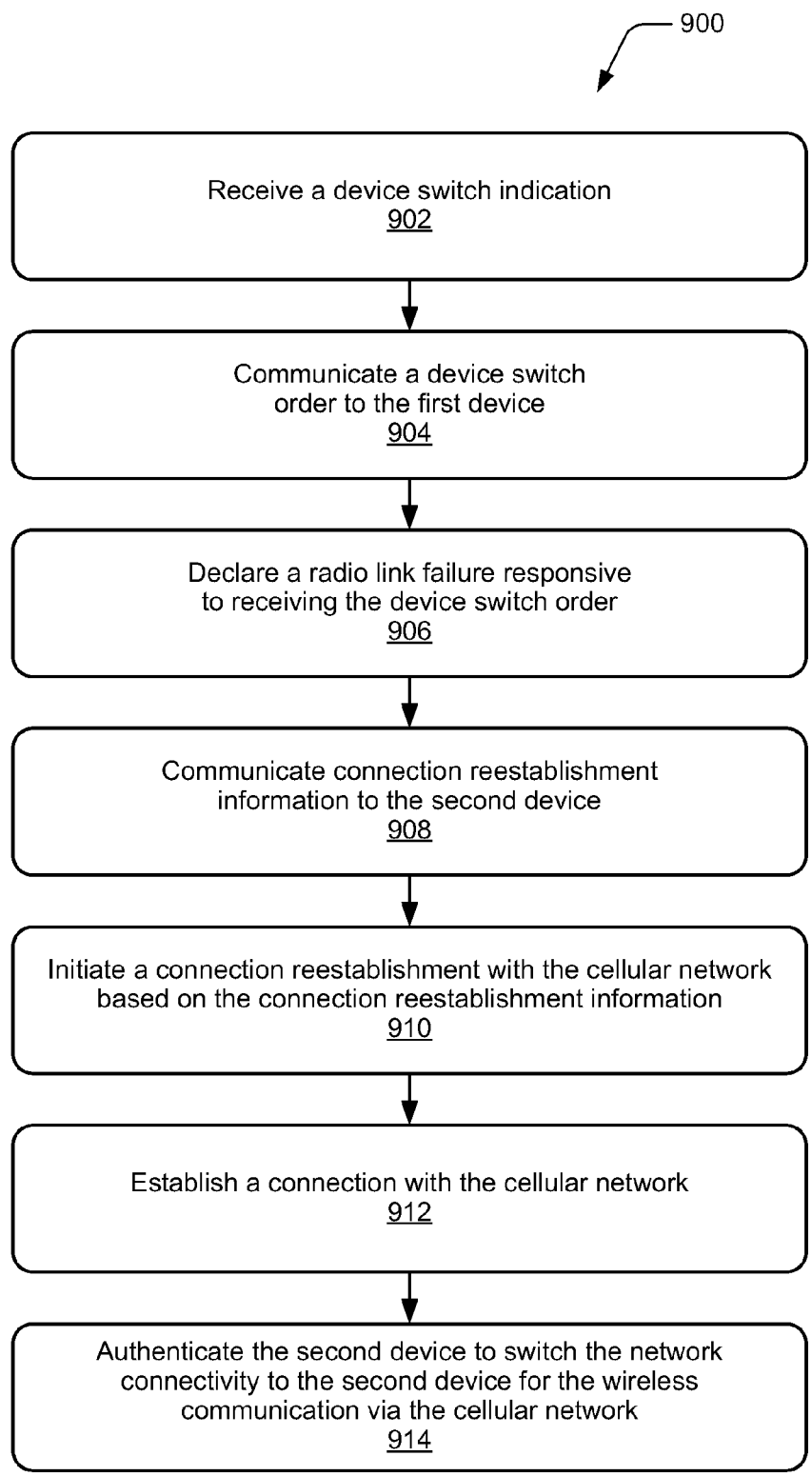
FIG. 9 illustrates example method(s) for the transfer of a radio link connection between user devices as enabled by an active authentication device in accordance with one or more embodiments.

FIG. 9 illustrates example method(s) 900 for the transfer of a radio link connection between user devices as enabled by an active authentication device in embodiments of network connectivity switching utilizing the authentication device 102, which is shown and described with reference to FIGS. 1 and 5. The order in which the method is described is not intended to be construed as a limitation, and any number or combination of the described method operations can be performed in any order to perform a method, or an alternate method.

At 902, a device switch indication is received. For example, the authentication device 102 is utilized to switch network connectivity from a first device (e.g., the mobile phone 104) to a second device (e.g., the tablet device 106). Initially, the mobile phone 104 is authenticated and communicatively linked for wireless communication via the cellular network 118, and the authentication device 102 receives the device switch indication 506 from the tablet device 106.

At 904, a device switch order is communicated to the first device. For example, the authentication device 102 communicates the device switch order 508 to the mobile phone 104. At 906, a radio link failure is declared responsive to receiving the device switch order. For example, the mobile phone 104 stops all transmissions via the cellular network 118 and declares a radio link failure 510 responsive to receiving the device switch order.

At 908, connection reestablishment information is communicated to the second device. For example, the mobile phone 104 communicates the switch proceed message 512 along with connection reestablishment information to the tablet device 106, and the message includes the authentication keys that are computed by the mobile phone 104 and negotiated with the cellular network 118, as well as information related to connection reestablishment.

At 910, a connection reestablishment with the cellular network is initiated based on the connection reestablishment information. For example, the tablet device 106 communicates the connection reestablishment message 514 to the cellular network 118 based on the information received from the mobile phone 104. In embodiments, the connection reestablishment message 514 is a radio resource control (RRC) connection reestablishment message. At 912, a connection with the cellular network is established. For example, the connection is then established at 516 to complete switching the network connectivity to the tablet device 106 (from the mobile phone 104) for wireless communication via the cellular network.

At 914, the second device is authenticated to switch the network connectivity to the second device for the wireless communication via the cellular network. For example, the tablet device 106 may receive an authentication request from the cellular network 118 when the network receives the RRC connection reestablishment message 514. The tablet device 106 then performs the remote device-based authentication 518 with the authentication device 102 that authenticates the tablet device 106 to the cellular network 118 (e.g., as shown and described with reference to FIG. 4).

Figure 10:
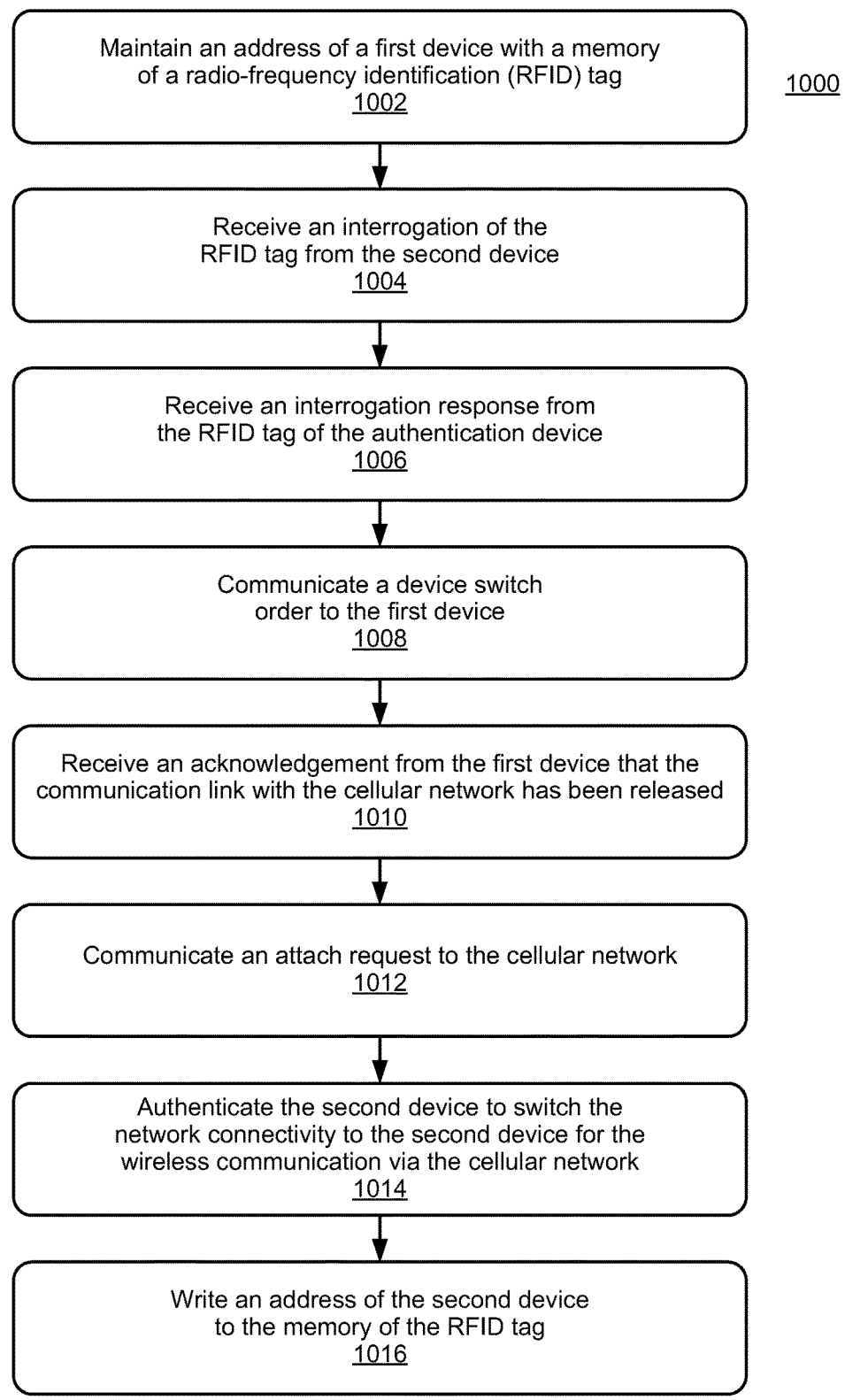
FIG. 10 illustrates example method(s) of re-authentication enabled by a passive authentication device in accordance with one or more embodiments.

FIG. 10 illustrates example method(s) 1000 of re-authentication enabled by a passive authentication device in embodiments of network connectivity switching utilizing the authentication device 202, which is shown and described with reference to FIGS. 2 and 6. The order in which the method is described is not intended to be construed as a limitation, and any number or combination of the described method operations can be performed in any order to perform a method, or an alternate method.

At 1002, an address of a first device is maintained with a memory of a radio-frequency identification (RFID) tag. For example, the authentication device 202 is utilized to switch network connectivity from a first device (e.g., the mobile phone 104) to a second device (e.g., the tablet device 106). Initially, the mobile phone 104 is authenticated and communicatively linked for wireless communication via the cellular network 118, and the mobile phone 104 initiates the RFID information write 604 to write an address of the mobile phone (e.g., a MAC or IP address) to the memory 210 on the RFID tag 208 of the authentication device 202 as an indication of the leader device that is currently communicatively linked for wireless communication via the cellular network 118. The RFID tag memory 210 maintains the connected device address 212 of the mobile phone 104.

At 1004, an interrogation of the RFID tag is received from the second device. For example, the RFID tag 208 of the authentication device 202 receives the RFID leader address request 608 as the RFID interrogation 216 from the RFID reader 214 of the tablet device 106. When the user switches devices (e.g., from the mobile phone 104 to use the tablet device 106), the RFID reader 214 of the tablet device 106 interrogates the RFID tag 208 of the authentication device 202 with the RFID leader address request 608 to determine the address of the leader device (e.g., the mobile phone 104 in this example) that is currently using the SIM credentials and communicatively linked for wireless communication via the cellular network 118.

At 1006, an interrogation response is received from the RFID tag of the authentication device. For example, the RFID reader 214 of the tablet device 106 receives an RFID tag response 610 of the requested leader address (e.g., the connected device address 212 that is maintained in memory 210 of the RFID tag 208 at the authentication device 202).

At 1008, a device switch order is communicated to the first device. For example, the tablet device 106 communicates the device switch order 612 to the mobile phone 104 using the leader device address obtained from the RFID tag 208 of the authentication device 202. In implementations, the device switch order 612 is a message to release the SIM or the USIM credentials that are the basis for the established connection 602 of the mobile phone 104 with the cellular network 118.

At 1010, an acknowledgement is received from the first device that the communication link with the cellular network has been released. For example, the tablet device 106 receives an acknowledgement, in the form of the SIM released indication 614, from the mobile phone 104 that the communication link with the cellular network 118 has been released. At 1012, an attach request is communicated to the cellular network. For example, the tablet device 106 communicates the attach request 616 to the cellular network 118.

At 1014, the second device is authenticated to switch the network connectivity to the second device for the wireless communication via the cellular network. For example, the authentication device 202 authenticates the tablet device 106 to the cellular network 118 with remote device-based authentication 618 (e.g., as shown and described with reference to FIG. 4). Authenticating the tablet device 106 includes the authentication device 202 receiving authentication request data 404 from the tablet device 106, which initially receives the authentication request data as the authentication request 402 (e.g., an authentication challenge) from the cellular network 118. The authentication device 202 then communicates an authentication response (e.g., the authentication data 406) back to the tablet device 106, which then forwards the authentication response 408 to the cellular network. The tablet device 106 is then communicatively linked for wireless communication via the cellular network 118 based on the authentication challenge and authentication response to the cellular network. The connection is established at 620 to complete the network connectivity switch from the mobile phone 104 to the tablet device 106.

At 1016, an address of the second device is written to the memory of the RFID tag. For example, the tablet device 106 initiates the RFID leader address write 622 to write an address of the tablet device (e.g., a MAC or IP address) to the RFID tag memory 210 on the RFID tag 208 of the authentication device 202 as an indication of the leader device that is currently communicatively linked for wireless communication via the cellular network 118. The RFID tag 208 of the authentication device 202 receives the address write 622 from the RFID reader 214 of the tablet device 106 and maintains the address of the tablet device with the RFID tag memory 210.

Figure 11:
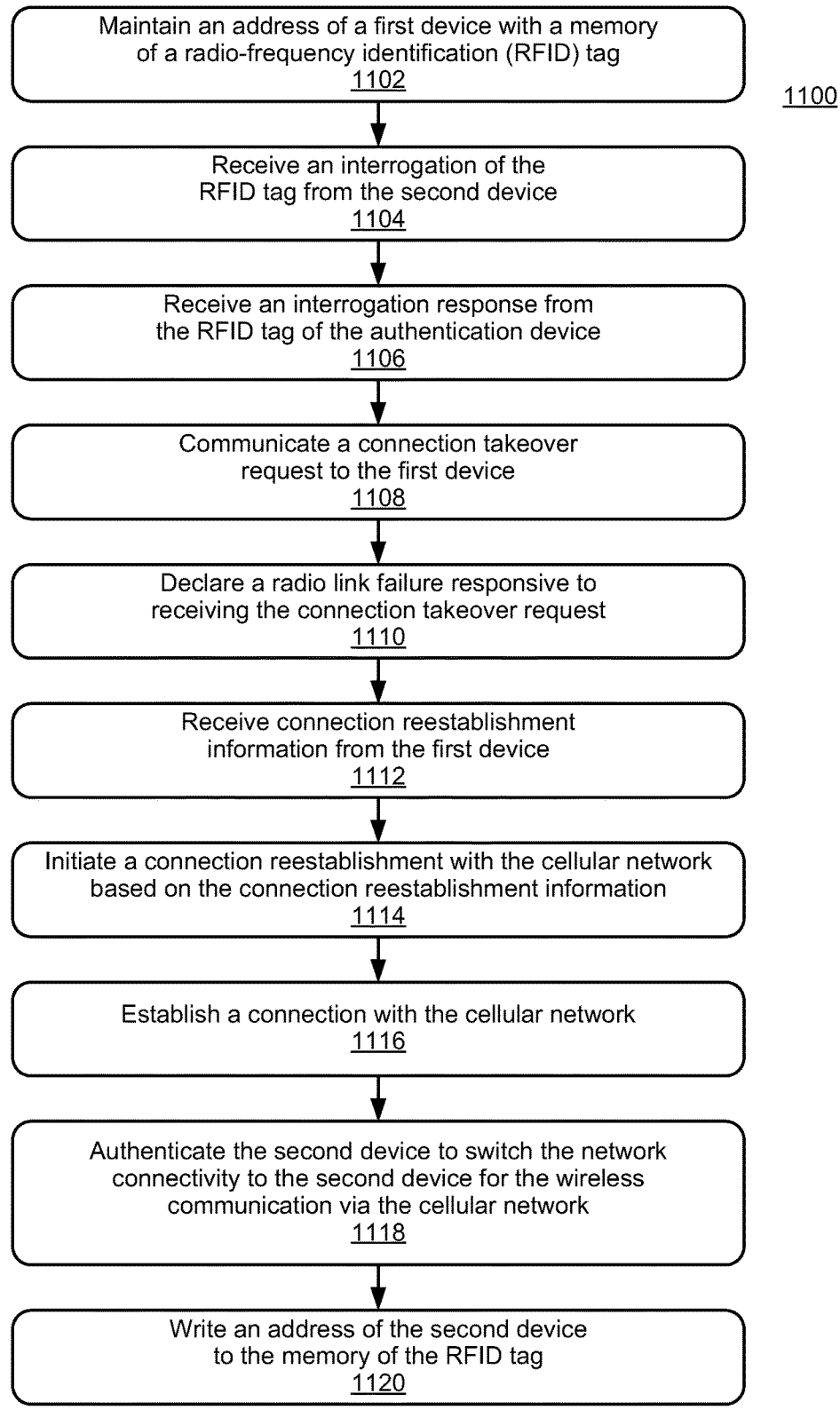
FIG. 11 illustrates example method(s) for the transfer of a radio link connection between user devices as enabled by a passive authentication device in accordance with one or more embodiments.

FIG. 11 illustrates example method(s) 1100 for the transfer of a radio link connection between user devices as enabled by a passive authentication device in embodiments of network connectivity switching utilizing the authentication device 202, which is shown and described with reference to FIGS. 2 and 7. The order in which the method is described is not intended to be construed as a limitation, and any number or combination of the described method operations can be performed in any order to perform a method, or an alternate method.

At 1102, an address of a first device is maintained with a memory of a radio-frequency identification (RFID) tag. For example, the authentication device 202 is utilized to switch network connectivity from a first device (e.g., the mobile phone 104) to a second device (e.g., the tablet device 106). Initially, the mobile phone 104 is authenticated and communicatively linked for wireless communication via the cellular network 118, and the mobile phone 104 initiates the RFID information write 704 to write an address of the mobile phone (e.g., a MAC or IP address) to the memory 210 on the RFID tag 208 of the authentication device 202 as an indication of the leader device that is currently communicatively linked for wireless communication via the cellular network 118. The RFID tag memory 210 maintains the connected device address 212 of the mobile phone 104.

At 1104, an interrogation of the RFID tag is received from the second device. For example, the RFID tag 208 of the authentication device 202 receives the RFID leader address request 708 as the RFID interrogation 216 from the RFID reader 214 of the tablet device 106. When the user switches devices (e.g., from the mobile phone 104 to use the tablet device 106), the RFID reader 214 of the tablet device 106 interrogates the RFID tag 208 of the authentication device 202 with the RFID leader address request 708 to determine the address of the leader device (e.g., the mobile phone 104 in this example).

At 1106, an interrogation response is received from the RFID tag of the authentication device. For example, the RFID reader 214 of the tablet device 106 receives an RFID tag response 710 of the requested leader address (e.g., the connected device address 212 that is maintained in memory 210 of the RFID tag 208 at the authentication device 202). At 1108, a connection takeover request is communicated to the first device. For example, the tablet device 106 communicates the connection takeover request 712 to the mobile phone 104 using the leader device address obtained from the RFID tag 208 of the authentication device 202.

At 1110, a radio link failure is declared responsive to receiving the connection takeover request. For example, the mobile phone 104 stops all transmissions via the cellular network 118 and declares the radio link failure 714 responsive to receiving the connection takeover request 712. Further, the tablet device 106 can receive an acknowledgement from the mobile phone 104 that the communication link with the cellular network 118 has been released, responsive to the mobile phone 104 receiving the connection takeover request.

At 1112, connection reestablishment information is received from the first device. For example, the tablet device 106 receives the switch proceed message 716 from the mobile phone 104, and the message includes the authentication keys that are computed by the mobile phone 104 and negotiated with the cellular network 118, as well as information related to connection reestablishment.

At 1114, a connection reestablishment with the cellular network is initiated based on the connection reestablishment information. For example, the tablet device 106 communicates the connection reestablishment message 718 to the cellular network 118 based on the information received from the mobile phone 104. In embodiments, the connection reestablishment message 718 is a radio resource control (RRC) connection reestablishment message. At 1116, a connection with the cellular network is established. For example, the connection is then established at 720 to complete switching the network connectivity to the tablet device 106 (from the mobile phone 104) for wireless communication via the cellular network 118.

At 1118, an address of the second device is written to the memory of the RFID tag. For example, the tablet device 106 initiates the RFID leader address write 722 to write an address of the tablet device (e.g., a MAC or IP address) to the RFID tag memory 210 on the RFID tag 208 of the authentication device 202 as an indication of the leader device that is currently communicatively linked for wireless communication via the cellular network 118. The RFID tag 208 of the authentication device 202 receives the address write 722 from the RFID reader 214 of the tablet device 106 and maintains the address of the tablet device with the RFID tag memory 210.

At 1120, the second device is authenticated to switch the network connectivity to the second device for the wireless communication via the cellular network. For example, the tablet device 106 may receive an authentication request from the cellular network 118 when the network receives the RRC connection reestablishment message 718. The tablet device 106 then performs the remote device-based authentication 724 with the authentication device 202 that authenticates the tablet device 106 to the cellular network 118 (e.g., as shown and described with reference to FIG. 4).

Figure 12:
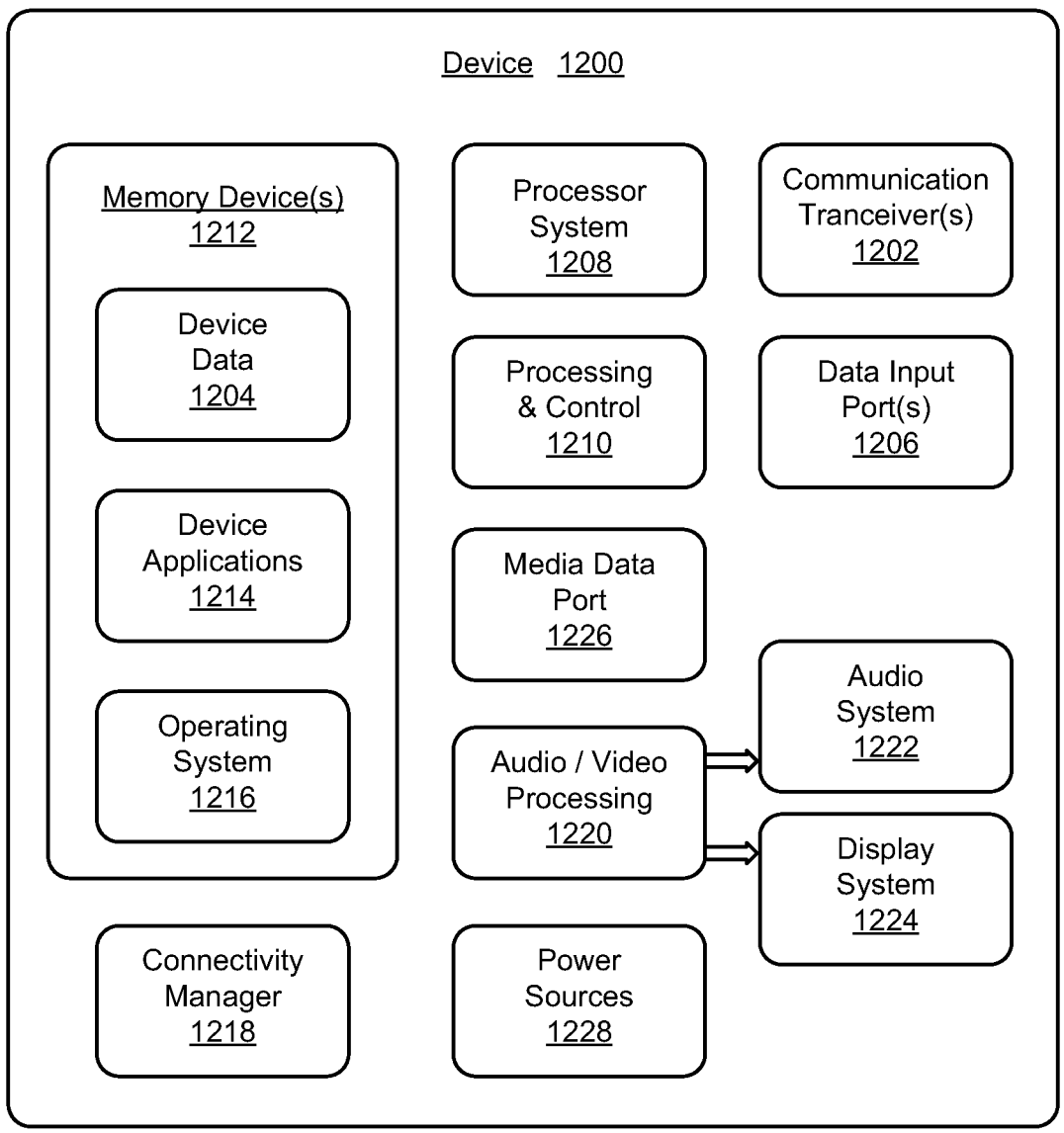
FIG. 12 illustrates various components of an example device that can implement embodiments of network connectivity switching utilizing an authentication device.

FIG. 12 illustrates various components of an example device 1200 in which embodiments of network connectivity switching utilizing an authentication device can be implemented. The example device 1200 can be implemented as any of the user, communication, and authentication devices described with reference to the previous FIGS. 1-11, such as any type of client device, mobile phone, tablet device, authentication device, computing, communication, entertainment, gaming, media playback, and/or other type of device. For example, the communication device 108, the mobile phone 104, the tablet device 106, the authentication device 102, and/or the authentication device 202 shown in FIGS. 1 and/or 2 may be implemented as the example device 1200.

The device 1200 includes communication transceivers 1202 that enable wired and/or wireless communication of device data 1204 with other devices. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 1200 may also include one or more data input ports 1206 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1200 includes a processing system 1208 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1210. The device 1200 may further include any type of a system bus or other data and command transfer system that couples the various components within the device. A system bus can include any one or combination of different bus structures and architectures, as well as control and data lines.

The device 1200 also includes computer-readable storage memory 1212 that enable data storage, such as data storage devices that can be accessed by a computing device, and that provide persistent storage of data and executable instructions (e.g., software applications, programs, functions, and the like). Examples of the computer-readable storage memory 1212 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1200 may also include a mass storage media device.

The computer-readable storage memory 1212 provides data storage mechanisms to store the device data 1204, other types of information and/or data, and various device applications 1214 (e.g., software applications). For example, an operating system 1216 can be maintained as software instructions with a memory device and executed by the processing system 1208. The device applications may also include a device manager, such as any form of a control application, software application, signal-processing and control module, code that is native to a particular device, a hardware abstraction layer for a particular device, and so on. In this example, the device 1200 includes a connectivity manager 1218 that implements embodiments of network connectivity switching utilizing an authentication device, and may be implemented with hardware components and/or in software, such as when the device 1200 is implemented as the authentication device 102 described with reference to FIG. 1.

The device 1200 also includes an audio and/or video processing system 1220 that generates audio data for an audio system 1222 and/or generates display data for a display system 1224. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1226. In implementations, the audio system and/or the display system are integrated components of the example device. Alternatively, the audio system and/or the display system are external, peripheral components to the example device.

The device 1200 can also include one or more power sources 1228, such as when the device is implemented as a mobile device. The power sources may include a charging and/or power system, and can be implemented as a flexible strip battery, a rechargeable battery, a charged super-capacitor, and/or any other type of active or passive power source.

Although embodiments of network connectivity switching utilizing an authentication device have been described in language specific to features and/or methods, the subject of the appended claims is not necessarily limited to the specific features or methods described. Rather, the specific features and methods are disclosed as example implementations of network connectivity switching utilizing an authentication device, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method implemented by an authentication device, the method comprising:
receiving a device switch indication that initiates switching network connectivity from a first device to a second device utilizing the authentication device, the first device authenticated and communicatively linked for wireless communication via a cellular network, the device switch indication received from the second device, which communicates via the cellular network;
communicating a device switch order to the first device responsive to the receiving the device switch indication from the second device;
receiving an acknowledgement from the first device that the communication link with the cellular network has been released responsive to the first device receiving the device switch order;
communicating a network attach indication to the second device that then communicates an attach request to the cellular network responsive to the receiving the acknowledgment from the first device; and
authenticating the second device to switch the network connectivity to the second device for the wireless communication via the cellular network.

2. The method as recited in claim 1, wherein the device switch order is a subscriber identity module (SIM) release order communicated to the first device, and the method further comprising:

receiving a SIM release acknowledgement from the first device, responsive to the first device receiving the device switch order.

3. The method as recited in claim 1, wherein said authenticating the second device comprises:
receiving authentication request data from the second device that receives the authentication request data as part of an authentication challenge from the cellular network; and
communicating an authentication response back to the second device that forwards the authentication response to the cellular network.

4. The method as recited in claim 3, wherein the second device is communicatively linked for the wireless communication via the cellular network based on the authentication challenge and authentication response to the cellular network.

5. The method as recited in claim 3, further comprising:
maintaining authentication data with a universal subscriber identity module (USIM), the authentication data utilized to authenticate the second device to the cellular network.

6. The method as recited in claim 1, wherein the authentication device is an active authentication device having a power source and implemented with a short-range, wireless communication system.

7. The method as recited in claim 1, wherein the authentication device includes one or more universal subscriber identity modules (USIMs), and the first device and the second device do not include a USIM.

8. A method implemented by an authentication device, the method comprising:
receiving a device switch indication that initiates switching network connectivity from a first device to a second device utilizing the authentication device, the first device authenticated and communicatively linked for wireless communication via a cellular network, the device switch indication received from the second device, which communicates via the cellular network; and
communicating a device switch order to the first device responsive to the receiving the device switch indication from the second device, the first device communicating connection reestablishment information to the second device responsive to the first device receiving the device switch order, and the second device initiates a connection reestablishment with the cellular network based on the connection reestablishment information.

9. The method as recited in claim 8, wherein:
the first device declares a radio link failure responsive to receiving the device switch order; and
the second device initiates the connection reestablishment with the cellular network as a radio resource control (RRC) connection reestablishment.

10. The method as recited in claim 8, further comprising:
authenticating the second device to switch the network connectivity to the second device for the wireless communication via the cellular network.

11. The method as recited in claim 10, wherein said authenticating the second device comprises:
receiving authentication request data from the second device that receives the authentication request data as part of an authentication challenge from the cellular network; and
communicating an authentication response back to the second device that forwards the authentication response to the cellular network.

12. The method as recited in claim 11, wherein the second device is communicatively linked for wireless communication via the cellular network based on the authentication challenge and authentication response to the cellular network.

13. The method as recited in claim 11, further comprising:
maintaining authentication data with a universal subscriber identity module (USIM), the authentication data utilized to authenticate the second device to the cellular network.

14. The method as recited in claim 8, wherein the authentication device is an active authentication device having a power source and implemented with a short-range, wireless communication system.

15. A system, comprising:
a first device that is authenticated and communicatively linked for wireless communication via a cellular network;
a second device configured for communication via the cellular network; and
an authentication device to switch network connectivity from the first device to the second device for the wireless communication via the cellular network, the authentication device configured to:
receive a device switch indication from the second device;
communicate a device switch order to the first device responsive to the device switch indication being received from the second device; and
receive network connection information from the second device to facilitate the switch of network connectivity from the first device to the second device.

16. The system as recited in claim 15, wherein the authentication device is an active authentication device having a power source and implemented with a short-range, wireless communication system for wireless communication with the first device and the second device.

17. The system as recited in claim 15, wherein:
the authentication device is configured to:
receive an acknowledgement from the first device that the communication link with the cellular network has been released;
communicate a network attach indication to the second device; and
the second device is configured to communicate an attach request to the cellular network.

18. The system as recited in claim 15, wherein:
the authentication device is configured to authenticate the second device to switch the network connectivity to the second device; and
the second device is communicatively linked for the wireless communication via the cellular network based on an authentication challenge and an authentication response to the cellular network.

19. The system as recited in claim 15, wherein:
the first device is configured to communicate connection reestablishment information to the second device; and
the second device is configured to initiate a connection reestablishment with the cellular network based on the connection reestablishment information.

20. The system as recited in claim 19, wherein:
the first device declares a radio link failure responsive to receiving the device switch order; and
the second device initiates the connection reestablishment with the cellular network as a radio resource control (RRC) connection reestablishment.

* * * * *